(12) United States Patent
Van Berge et al.

(10) Patent No.: US 6,875,720 B2
(45) Date of Patent: Apr. 5, 2005

(54) METHOD OF TREATING AN UNTREATED CATALYST SUPPORT, AND FORMING A CATALYST PRECURSOR AND CATALYST FROM THE TREATED SUPPORT

(75) Inventors: Peter Jacobus Van Berge, Sasolburg (ZA); Jan Van De Loosdrecht, Sasolburg (ZA); Sean Barradas, Parys (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 0 days.

(21) Appl. No.: 10/349,330

(22) Filed: Jan. 22, 2003

(65) Prior Publication Data

US 2003/0162849 A1 Aug. 28, 2003

Related U.S. Application Data

(63) Continuation of application No. PCT/IB01/01310, filed on Jul. 23, 2001
(60) Provisional application No. 60/220,769, filed on Jul. 24, 2000.

(51) Int. Cl.[7] .................... B01J 31/00; B01J 37/00; B01J 33/00; C08F 4/02; C08F 4/60
(52) U.S. Cl. ..................................... 502/103
(58) Field of Search ........................ 502/103

(56) References Cited

U.S. PATENT DOCUMENTS

| | | | |
|---|---|---|---|
| 3,274,120 A | 9/1966 | Aftandilian | 252/432 |
| 4,547,283 A | 10/1985 | Neel et al. | 208/46 |
| 4,748,145 A | 5/1988 | Wood et al. | 502/332 |
| 5,733,839 A | 3/1998 | Espinoza et al. | 502/336 |
| 6,074,980 A * | 6/2000 | Derleth et al. | 502/214 |
| 6,130,184 A * | 10/2000 | Geerlings et al. | 502/350 |
| 6,207,128 B1 * | 3/2001 | Sellin et al. | 423/588 |
| 6,313,062 B1 * | 11/2001 | Krylova et al. | 502/326 |
| 6,433,108 B1 * | 8/2002 | Malinge et al. | 526/65 |
| 6,455,462 B2 * | 9/2002 | van Berge et al. | 502/325 |
| 6,462,098 B1 * | 10/2002 | Vogel et al. | 518/700 |
| 6,465,530 B2 * | 10/2002 | Roy-Auberger et al. | 518/715 |
| 6,638,889 B1 * | 10/2003 | Van Berge et al. | 502/300 |

FOREIGN PATENT DOCUMENTS

| | | | | |
|---|---|---|---|---|
| GB | WO 99/42214 A1 * | 8/1999 | | B01J/33/00 |
| WO | 9733690 | 9/1997 | | |
| WO | 9942214 | 8/1999 | | |
| WO | 00/20116 | 4/2000 | | |

* cited by examiner

Primary Examiner—Mark L. Bell
Assistant Examiner—Jennine M. Brown
(74) Attorney, Agent, or Firm—Ladas & Parry LLP

(57) ABSTRACT

A method of treating an untreated catalyst support includes contacting an untreated catalyst support which is partially soluble in an aqueous acid and/or a neutral aqueous solution with a modifying component precursor of the formula $Me(OR)_x$ where Me is a modifying component selected from Si, Zr, Ti, Cu, Zn, Mn, Ba, Co, Ni, Na, K, Ca, Sn, Cr, Fe, Li, TI, Mg, Sr, Ga, Sb, V, Hf, Th, Ce, Ge, U, Nb, Ta, and W, R is an alkyl or acyl group, and x is an integer having a value of from 1 to 5. The modifying component is thereby introduced onto and/or into the catalyst support to form a protected modified catalyst support which is less soluble in the aqueous acid and/or the neutral aqueous solution. No calcination of the protected modified catalyst support is effected.

18 Claims, 3 Drawing Sheets

METHOD OF TREATING AN UNTREATED CATALYST SUPPORT, AND FORMING A CATALYST PRECURSOR AND CATALYST FROM THE TREATED SUPPORT

This application is a continuation of International Application PCT/IB01/01310 filed on 23 Jul. 2001, which claims the benefit of U.S. provisional application 60/220,769 filed Jul. 24, 2000, and which designated the U.S., claims the benefit thereof and incorporates the same by reference.

THIS INVENTION relates to the production of hydrocarbons from a synthesis gas, and to catalysts therefor. It relates in particular to a method of treating an untreated catalyst support to form a protected modified catalyst support, to a protected modified catalyst support thus formed, to a method of forming a catalyst from the protected modified catalyst support, to a catalyst thus obtained, to a process for producing hydrocarbons, and to hydrocarbons thus produced.

According to a first aspect of the invention, there is provided a method of treating an untreated catalyst support, which method includes contacting an untreated catalyst support which is partially soluble in an aqueous acid solution and/or in a neutral aqueous solution with a modifying component precursor of the formula Me(OR)$_x$ where Me is a modifying component selected from Si, Zr, Ti, Cu, Zn, Mn, Ba, Co, Ni, Na, K, Ca, Sn, Cr, Fe, Li, Tl, Mg, Sr, Ga, Sb, V, Hf, Th, Ce, Ge, U, Nb, Ta, and W, R is an alkyl or acyl group, and x is an integer having a value of from 1 to 5, thereby to introduce the modifying component onto and/or into the catalyst support and to form a protected modified catalyst support which is less soluble or more inert in the aqueous acid solution and/or the neutral aqueous solution, than the untreated catalyst support, with no calcination of the catalyst support, after treatment thereof with the modifying component precursor, being effected.

The untreated catalyst support may, in particular, be in particulate form. The modifying component is thus present, in the protected modified catalyst support particles, on the particle surfaces, i.e. the modifying component is chemically bonded to the particle surfaces. The modifying component may be chemically bonded to OH (hydroxyl groups) on the support surfaces.

By 'calcination' is meant treatment of a catalyst support at an elevated temperature of at least 100° C. to decompose organic groups of the modifying component in air, as well as to remove any residual solvent used for impregnation of the modifying component into or onto the catalyst support as hereinafter described. Thus, the present invention is characterized thereby that the protected modified catalyst support is not subjected to heat treatment at 100° C. or higher. This naturally does not exclude possibly subjecting the protected modified catalyst support to heat treatment in excess of 100° C. during subsequent transformation of the protected modified support into a catalyst precursor or into a catalyst, as hereinafter described.

The modifying component is thus capable, when present on the catalyst support, of suppressing the solubility of the untreated catalyst support in the aqueous acid solution and/or the neutral aqueous solution.

In principle, any commercially available dried, eg spray-dried, untreated catalyst support that is partially soluble in an aqueous acid solution and/or in a neutral aqueous solution, can be used. Examples of untreated catalyst supports that can be used are alumina ($Al_2O_3$), titania ($TiO_2$), magnesia (MgO) and zinc oxide (ZnO). When the catalyst support is alumina, any suitable alumina support can, in principle, be used. For example, the alumina support may be that obtainable under the trademark PURALOX SCCa 2/150 from SASOL Germany GmbH. PURALOX SCCa 2/150 (trademark) is a spray-dried alumina support. Similarly, when the catalyst support is titania, any suitable titania support can, in principle, be used. For example, the titania support may be that obtainable under the trademark DEGUSSA P25.

By 'untreated' in relation to the catalyst support is meant a catalyst support that is partially soluble in an aqueous acid solution and/or in a neutral aqueous solution.

The contacting of the untreated catalyst support with the modifying component precursor may be by means of impregnation or chemical vapour deposition; however, impregnation is preferred.

In one embodiment of the invention, the modifying component precursor may be a silicon-based modifying component precursor or an organic silicon compound, eg a silicon alkoxide, so that the modifying component is silicon (Si). The organic silicon compound may then be tetra ethoxy silane ('TEOS', i.e. $Si(OC_2H_5)_4$) or tetra methoxy silane ('TMOS', i.e. $Si(OCH_3)_4$).

When a silicon-based modifying component precursor is used with an alumina catalyst support, it may then be used in a quantity such that the silicon level in the resultant protected modified catalyst support is at least 0.06 Si atoms/$nm^2$ of the untreated support, preferably at least 0.13 Si atoms/$nm^2$ of the untreated support, and more preferably at least 0.26 Si atoms/$nm^2$ of the untreated support.

The upper limit of the modifying component, eg silicon, in the protected modified catalyst support may be set by parameters such as the porosity of the protected modified catalyst support and/or by the average pore diameter of the protected modified catalyst support. Preferably, the average pore diameter of the protected modified catalyst support as hereinafter described is at least 12 nm, as disclosed in ZA 96/2759, which is hence incorporated herein by reference thereto. Additionally, if an objective is to obtain, from the protected modified catalyst support, a catalyst having a composition of 30 g Co/100 g $Al_2O_3$, the untreated $Al_2O_3$ catalyst support, and also the protected modified catalyst support, must have a pore volume of at least 0.43 ml/g, as described in U.S. Pat. No. 5,733,839, WO 99/42214 and/or WO 00/20116, which are thus incorporated herein by reference. The upper limit of the modifying component, e.g. Si, in the protected modified catalyst support is thus to be selected in such a manner that the geometry, e.g. the average pore diameter and porosity, of the protected modified catalyst support is not detrimentally effected to an appreciable extent.

Thus, when spray-dried PURALOX SCCa 2/150 (trademark) alumina is used as the untreated catalyst support, sufficient silicon-based modifying component precursor is used such that the upper limit of silicon in the resultant protected modified catalyst support is 2.8 Si atoms/$nm_2$ of untreated catalyst support, preferably 2.5 Si atoms/$nm_2$ of untreated catalyst support, as taught in WO 99/42214.

The maximum amount of silicon that can be added to the untreated catalyst support in one impregnation step is 2.8 Si atoms/$nm^2$ of untreated catalyst support.

When the contacting of the catalyst support with the silicon-based modifying component precursor or organic silicon compound is effected by way of impregnation, the organic silicon compound will be dissolved in an impregnation solvent having a boiling point, at atmospheric pressure, of less than 100° C. The impregnation solvent is typically an organic solvent capable of dissolving the silicon compound, such as ethanol, acetone or propanol. The untreated catalyst support may then be admixed with the resultant solution to form a treatment mixture, and the treatment mixture maintained at an elevated temperature for a period of time to impregnate the modifying agent into and/or onto the catalyst support. The elevated temperature may be at or near the boiling point of the impregnation solvent. The impregnation may be effected at atmospheric pressure, and the period of time for which the impregnation is effected may be from 1 minute to 20 hours, preferably from 1 minute to 5 hours. The excess solvent or solution is then removed, ie the impregnated support is dried, to obtain the protected modified catalyst support. The drying may be effected under a drying pressure or vacuum of 0.01 to 1 bar(a), more preferably 0.01 to 0.3 bar(a), and at a temperature equal to the boiling point of the solvent at the drying pressure, eg using known drier equipment, fitted with a mixing device, and of which the jacket temperature is thus higher than the solvent boiling point. However, the drying temperature will be lower than 100° C.

In another embodiment of the invention, the modifying component precursor may be a zirconium alkoxide, eg zirconium isopropoxide ($Zr(OCH(CH_3)_2)_4$), so that the modifying component is zirconium (Zr). The contacting of the untreated catalyst support with the zirconium alkoxide may then be effected in similar fashion to the contacting hereinbefore described for the silicon-based modifying component precursor.

According to a second aspect of the invention, there is provided a method of treating an untreated catalyst support, which method includes admixing an untreated catalyst support which is partially soluble in an aqueous acid solution and/or in a neutral aqueous solution, with a solution of a modifying component precursor of the formula $Me(OR)_x$ where Me is a modifying component selected from Si, Zr, Ti, Cu, Zn, Mn, Ba, Co, Ni, Na, K, Ca, Sn, Cr, Fe, Li, Tl, Mg, Sr, Ga, Sb, V, Hf, Th, Ce, Ge, U, Nb, Ta, and W, R is an alkyl or acyl group, and x is an integer having a value of from 1 to 5, in an impregnation solvent having a boiling point, at atmospheric pressure, of less than 100° C., to form a treatment mixture;

maintaining the treatment mixture at or near the boiling point of the impregnated solvent for from 1 minute to 20 hours, to impregnate the catalyst support with the modifying component; and drying the impregnated support by removing excess solvent or solution under a vacuum of 0.01 to 1 bar(a), thereby to obtain a protected modified catalyst support which is less soluble or more inert in the aqueous acid solution and/or the neutral aqueous solution than the untreated catalyst support, with no calcination of the catalyst support, after treatment thereof with the modifying component precursor, being effected, and with the modifying component thus being capable, when present in and/or on the protected modified catalyst support, of suppressing the solubility of the protected modified catalyst support in the aqueous solution.

The method may include washing the protected modified catalyst support to remove any residual solvent, with a slurry comprising the washed catalyst support and washing liquid being formed, and drying the slurry.

The washing may be effected with an aqueous solution, and may be effected at a temperature of about 60° C. for a period of time, eg for about 1 hour.

The drying of the slurry may be effected at a temperature of about 95° C., and under a vacuum of between 0.03 bar(a) and 0.2 bar(a).

The invention extends to a protected modified catalyst support, when obtained by the method as hereinbefore described.

According to a third aspect of the invention, there is provided a method of forming a catalyst precursor, which method comprises mixing a protected modified catalyst support as hereinbefore described, with an aqueous solution of an active catalyst component or its precursor, to form a slurry, and impregnating the protected modified catalyst support with the active catalyst component or its precursor, to form the catalyst precursor.

The active catalyst component precursor may be cobalt nitrate so that the active catalyst component in and on the catalyst is cobalt. The untreated catalyst support may, as hereinbefore described, be alumina.

The method of forming the catalyst precursor may be in accordance with that described in U.S. Pat. No. 5,733,839, WO 99/42214, and/or WO 00/20116, which are thus incorporated herein by reference. Thus, the mixing of the protected modified catalyst support and the active catalyst component or its precursor aqueous solution, and the impregnating, may comprise subjecting a slurry of the protected modified catalyst support or carrier, water and the active catalyst component or its precursor to a sub-atmospheric pressure environment, drying the resultant impregnated carrier under a sub-atmospheric pressure environment, and calcining the dried impregnated carrier, to obtain the catalyst precursor, ie to obtain a Fischer-Tropsch catalyst in unreduced form.

If a higher catalyst cobalt loading is required, then a second or even a third impregnation, drying and calcination step may thereafter be carried out after the first impregnation, drying and calcination step hereinbefore described.

During the impregnation, a water soluble precursor salt of platinum (Pt) or palladium (Pd) may be added, as a dopant capable of enhancing the reducibility of the active component. The mass proportion of this dopant, when used, to active catalyst component may be between 0.01:100 and 0.3:100.

The invention extends also to a catalyst precursor, when obtained by the method as hereinbefore described.

This catalyst precursor is thus in unreduced form, and requires reduction or activation before it can be used, ie it requires reduction or activation to be converted to a catalyst. This may be effected by subjecting the precursor to heat treatment under the influence of a reducing gas such as hydrogen, to obtain the catalyst.

Thus, according to a fourth aspect of the invention, there is provided a method of forming a catalyst, which includes reducing or activating a catalyst precursor as hereinbefore described.

The invention thus extends also to a catalyst, when obtained by the method as hereinbefore described.

According to a fifth aspect of the invention, there is provided a process for producing hydrocarbons, which includes contacting a synthesis gas comprising hydrogen and carbon monoxide at an elevated temperature between 180° C. and 250° C. and an elevated pressure between 10 and 40 bar with a catalyst as hereinbefore described, to obtain hydrocarbons, by means of a slurry phase Fischer-Tropsch reaction of the hydrogen with the carbon monoxide.

The invention extends also to hydrocarbons, when produced by the process as hereinbefore described.

It is known that an alumina supported cobalt based slurry phase Fischer-Tropsch catalyst produces a wax product when used in a Fischer-Tropsch reaction of a synthesis gas, comprising hydrogen and carbon monoxide.

Such catalysts have hitherto preferably been produced by slurry impregnation of an alumina support using an aqueous cobalt nitrate precursor solution, of which the pH can vary between 1 and 6. The alumina support partially dissolves in aqueous acid, as well as neutral aqueous solutions. After dissolution, the aluminium ions can, in the presence of cobalt ions:

(i) re-precipitate as hydrotalcite-like structures, eg $Co_6Al_2CO_3(OH)_{16}.4H_2O$; and/or (ii) re-precipitate as boehmite (AlOOH).

These re-precipitated aluminium structures are postulated to be physically bonded and loosely adsorbed to the original alumina surface. The formation of irregular structures on the surfaces of supports present after impregnation of, respectively, alumina with an aqueous nickel nitrate solution, magnesia with an aqueous ruthenium chloride solution and titania with an aqueous platinum chloride solution is also found. This phenomenon is thus not limited to alumina ($Al_2O_3$), but can also be found when using alternative supports such as magnesia (MgO), titania ($TiO_2$) or zinc oxide (ZnO).

A serious problem that can arise when such catalysts, which are thus prepared on untreated catalyst supports, are used, as observed during larger scale pilot plant Fischer-Tropsch synthesis runs, is the undesired high cobalt content of the wax product. Testing of the slurry phase Fischer-Tropsch synthesis process, using the known untreated alumina supported cobalt catalyst, can result in the wax product containing more than 50 mass ppm cobalt, even after secondary ex-situ filtration through a Whatmans 42 (trademark) filter paper (hereinafter referred to as "secondary filtered wax product". During slurry impregnation of an untreated alumina support, using an aqueous cobalt nitrate solution, cobalt nitrate will also deposit on the loosely bonded re-precipitated aluminium structures. These cobalt on loosely bonded re-precipitated aluminium structures can dislodge during extended Fischer-Tropsch synthesis runs, possibly aggravated by the hydrothermal nature of a realistic synthesis environment, and contaminate the wax product (hydrocarbon product that is a liquid at the applied Fischer-Tropsch synthesis conditions and withdrawn as such from the reactor) with cobalt rich ultra fines of a sub-micron nature. These cobalt rich ultra fine particulates, of submicron nature, exit the reactor in the wax product. Due to the high cost of cobalt, this is a highly undesirable problem which has thus been, solved, or at least alleviated, with this invention. Said alumina support should thus be protected during aqueous slurry impregnation by improving the inertness of the alumina surface, to prevent formation of cobalt ultra fines during Fischer-Tropsch synthesis. This is achieved in the present invention.

The invention will now be described in more detail with reference to the following non-limiting examples and with reference to the accompanying drawings.

In the drawings

Figure 4:
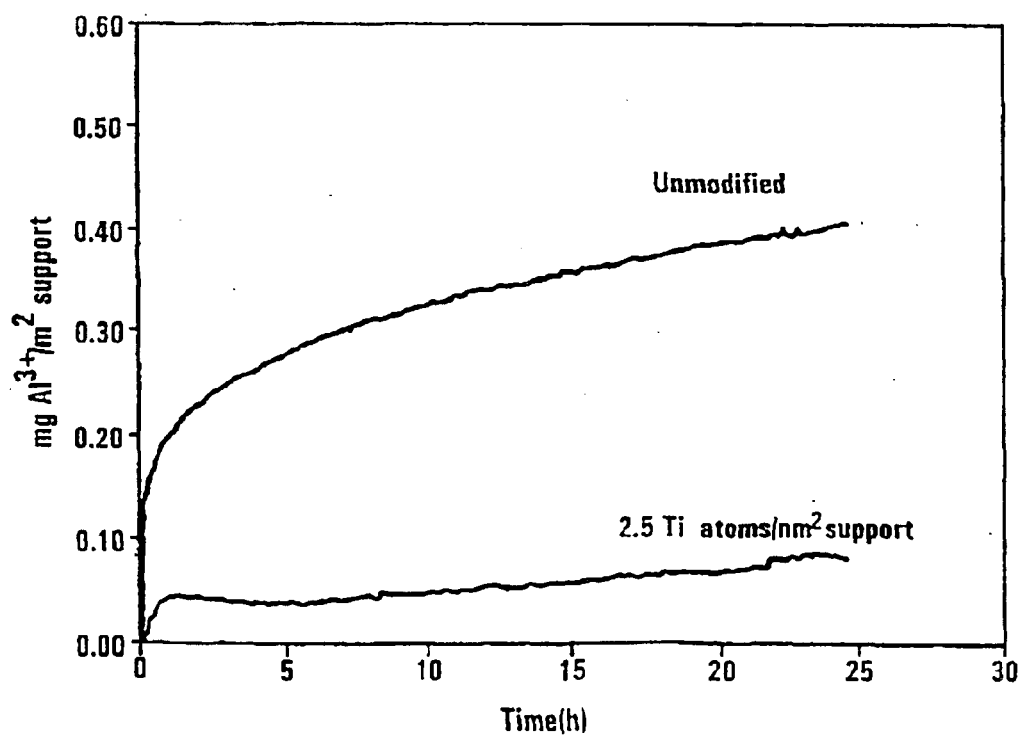
Figure 5:
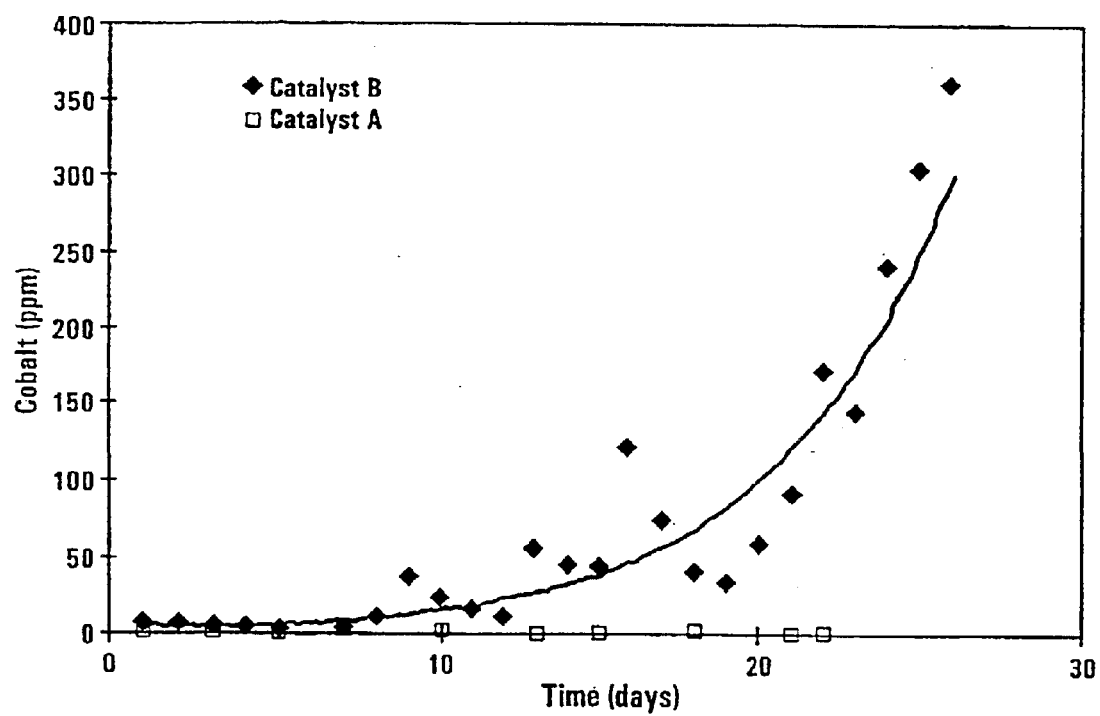

FIG. 4 shows dissolution profiles for an untreated alumina support, and a titanium modified alumina support according to Example 4; and FIG. 5 shows the cobalt contamination level of secondary filtered wax product as a function of Fischer-Tropsch slurry phase synthesis time on stream as observed on Pilot Plant scale. Supported cobalt Fischer-Tropsch synthesis catalysts were compared, as obtained form an untreated particulate alumina support known by the trademark PURALOX SCCa 2/150 (Catalyst B) and from a silicon modified alumina support (Catalyst A) in accordance with the invention.

EXAMPLE 1

Modification of Alumina Support with Silicon

A spray-dried PURALOX SCCa 2/150 (trademark) alumina support, in the form of spherical particles, obtainable form SASOL Germany GmbH of Überseering 40,22297, Hamburg, Germany, was used. The support was thus an untreated support. The surfaces of the support particles were modified with silicon. An impregnation method was used to achieve the modification. Thus, silicon, in the form of TEOS (tetra ethoxy salane) as precursor, was added to ethanol at 60° C. Ethanol was thus used as the impregnation solvent. The particulate alumina support was added to this solution, which was then kept at 50° C.–75° C. for 1 hour. Subsequently, the solvent was removed under vacuum at 0.03–0.2bar(a), with a jacket temperature of the drier equipment of 95° C. No calcination was employed after the drying. A protected silicon modified alumina support was thus obtained. The aim for silicon content was 2.5 Si atoms/nm² untreated support.

EXAMPLE 2

Modification of Titania Support with Silicon

An untreated or fresh particulate titanium dioxide DEGUSSA P25 (trademark)) support was calcined at 650° C. for 16 hours, spray dried and classified to 75–150 micron. The support has a rutile content of 80% and a surface area of 27 m²/g.

This support was modified in the same fashion as described in Example 1 by addition of TEOS and drying at 95° C., to obtain a protected silicon modified titania support. No calcination was employed after the drying. The aimed for silicon content was 4.5 Si atoms/nm² untreated resh support.

EXAMPLE 3

Modification of Alumina Support with Zirconium

Zirconium, in the form of zirconium isopropoxide as precursor, was added under an inert atmosphere to isopropanol. Isopropanol was thus used as the impregnation solvent. A particulate alumina support (which was the same as that used in Example 1) was added to this solution, and the mixture stirred at 60° C. for 1 hour. The solvent was then removed under a vacuum of 0.03–0.2 bar(a) with a jacket temperature of the drier equipment at 95° C. No calcination was employed after the drying. A protected zirconium modified alumina support was thus obtained. The aimed for amount of modifying component was 0.1 Zr atoms per square nanometer untreated support.

EXAMPLE 4

Modification of Alumina Support with Titanium

A particulate alumina support, the same support as used in Example 1, was modified in the same fashion as described in Example 1, using TEOT (tetra ethyl ortho titanate) as the precursor rather than TEOS, with drying at 95° C. No calcination was employed after the drying. A protected titanium modified alumina support was thus obtained. The aimed for titanium content was 2.5 Ti atoms/nm² untreated support.

EXAMPLE 5

Conductivity Measurements

Alumina and titania dissolve in an aqueous medium at low pH. The dissolution of alumina or titania results in the formation of aluminium ions or titanium ions respectively. As more and more alumina or titania dissolves, the concentration of aluminium or titanium ions increases with time. The increase of aluminium or titanium ions with time was followed by monitoring the conductivity at a constant pH of 2. The pH was kept constant by automated addition of a 10% nitric acid solution.

Figure 1:
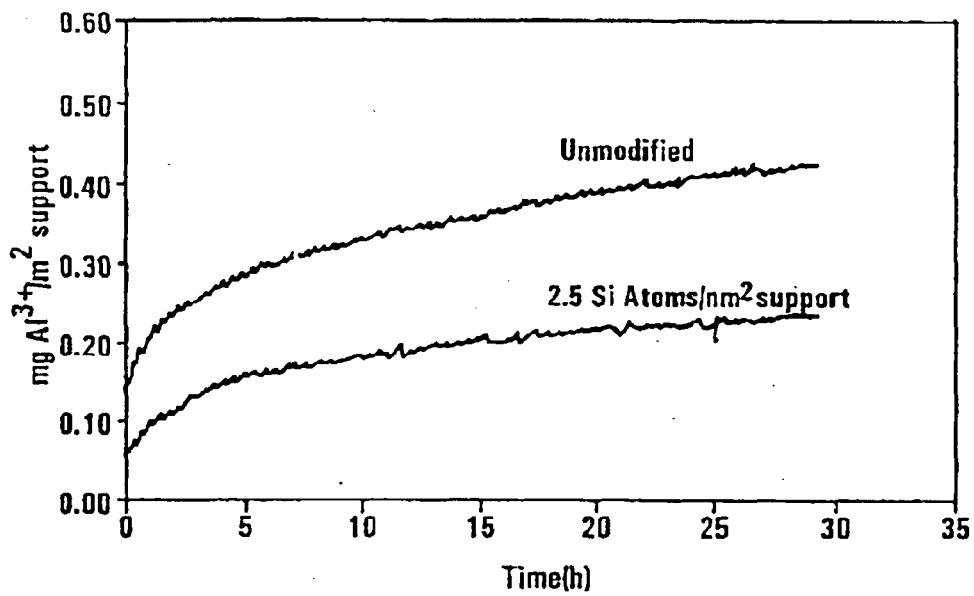
FIG. 1 shows dissolution profiles for an untreated alumina support, and a silicon modified alumina support according to the Example 1.

In FIG. 1, the cumulative mg Al dissolved per $m^2$ untreated support for an untreated alumina as well as for the protected silicon modified alumina of Example 1 was plotted against time. It can be seen that the untreated pure alumina dissolved faster than the protected silicon modified alumina.

Figure 2:
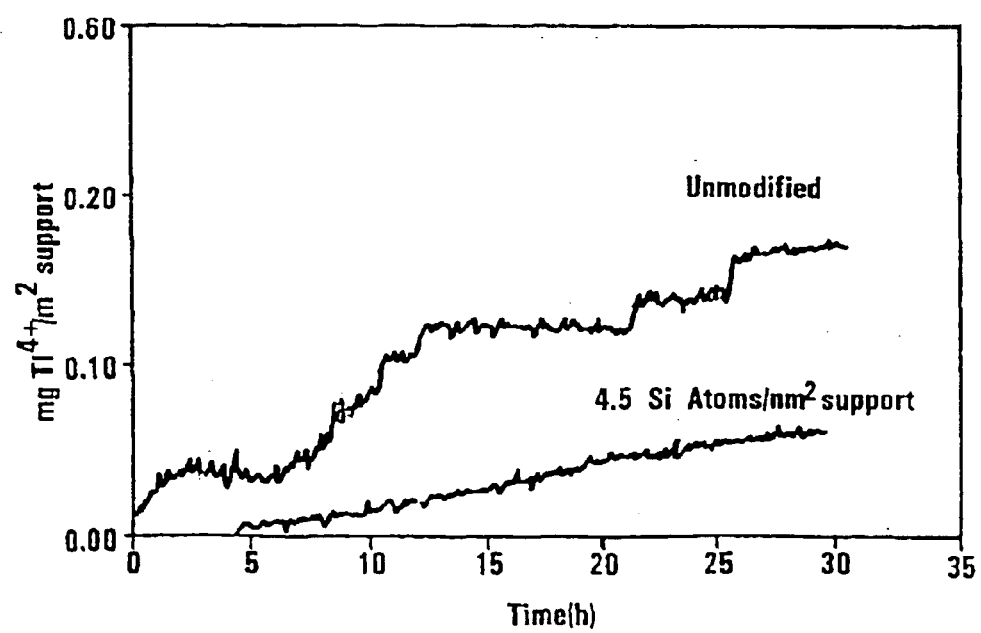
FIG. 2 shows dissolution profiles for an untreated titania support, and a silicon modified titania support according to Example 2.

In FIG. 2, the dissolution profiles of untreated titania as well as of the protected silicon modified titania of Example 2 are plotted. This Figure indicates that modification of the untreated titania brought about an increase in resistance to dissolution.

Figure 3:
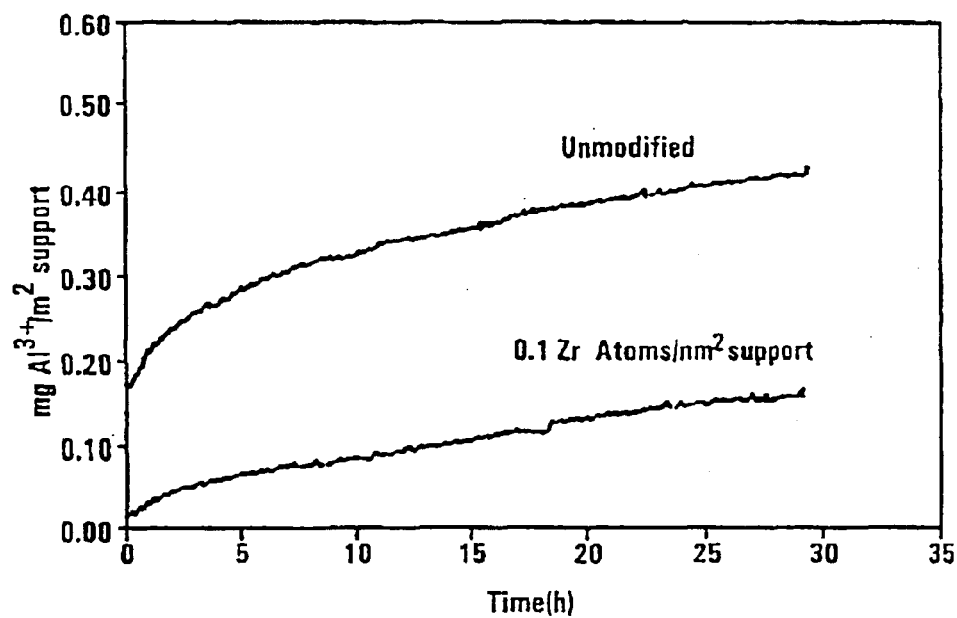
FIG. 3 shows dissolution profiles for an untreated alumina support, and a zirconium modified alumina support according to Example 3.

In FIG. 3, the dissolution profile of the untreated PURALOX SCCa 2/150 (trademark) alumina support is plotted against the dissolution profile of the protected zirconium modified alumina support of Example 3. FIG. 3 shows that eh addition of zirconium to the untreated support improved the resistance of the untreated support to dissolution and aqueous/acid attack.

In FIG. 4, the cumulative mg Al dissolved per $m^2$ untreated support for an unmodified alumina as well as for the protected titanium modified alumina of Example 4 was plotted against time. It can be seen that the untreated pure alumina dissolved faster than the protected titanium modified alumina.

EXAMPLE 6

1. Catalyst Preparation

Catalyst A

A supported cobalt catalyst precursor was prepared on a protected silicon modified alumina support as prepared in Example 1. In a first impregnation/drying/calcination step, a solution of 17.4 kg of $Co(NO_3)_2.6H_2O$, 9.6 g of $(NH_3)_4Pt(NO_3)_2$, and 11 kg of distilled water was mixed with 20.0 kg of a silicon modified alumina support, by adding the support to the solution. The slurry was added to a conical vacuum drier and continuously mixed. The temperature of this slurry was increased to 60° C. after which a pressure of 20 kPa(a) was applied. During the first 3 hours of the drying step which commenced with the application of the pressure of 20 kPa(a), the temperature was increased slowly and reached 95° C. after the 3 hours. After the 3 hours, the pressure was decreased to 3–15 kPa(a), and a drying rate of 2.5 m%/h at the point of incipient wetness was used. The impregnation and drying took 9 hours to complete, after which the impregnated and dried catalyst support was immediately and directly loaded into a fluidized bed calciner. The temperature of the dried impregnated catalyst support was about 75° C. at the time of loading into the calciner. The loading took about 1 to 2 minutes, and the temperature inside the calciner remained at its set point of about 75° C. The catalyst was heated from 75° C. to 250° C., using a heating rate of 0.5° C./min and an air space velocity of 1.0 $m^3{}_n$/kg $Co(NO_3)_2.6H_2O$/h, and kept at 250° C. for 6 hours. To obtain a catalyst with a cobalt loading of 30 gCo/100 g$Al_2O_3$, a second impregnation/drying/calcination step was performed. A solution of 9.4 kg of $Co(NO_3)_2.6H_2O$, 15.7 g of $(NH_3)_4Pt(NO_3)_2$, and 15.1 kg of distilled water was mixed with 20.0 kg of the ex first impregnated and calcined intermediate, by adding this material to the solution. The slurry was added to a conical vacuum drier and continuously mixed. The temperature of this slurry was increased to 60° C. after which a pressure of 20 kPa(a) was applied. During the first 3 hours of the drying step which commenced with the application of the pressure of 20 kPa(a), the temperature was increased slowly and reached 95° C. after the 3 hours. After the 3 hours, the pressure was decreased to 3–15 kPa(a), and a drying rate of 2.5 m%/h at the point of incipient wetness was used. The impregnation and drying took 9 hours to complete, after which the catalyst support was immediately and directly loaded into the fluidized bed calciner. The temperature of the dried impregnated intermediate material was about 75° C. at the time of loading into the calciner. The loading took about 1 to 2 minutes, and the temperature inside the calciner remained at its set point of about 75° C. The impregnated and dried material was heated from 75° C. to 250° C., using a heating rate of 0.5° C./min and an air space velocity of 1.0 $m^3{}_n$/kg $Co(NO_3)_2.6H_2O$/h, and kept at 250° C. for 6 hours.

Catalyst B

A supported cobalt catalyst precursor was prepared in a similar manner to that described hereinbefore for Catalyst A, except that the catalyst precursor was prepared on an untreated alumina support.

2. Pilot Plant Slurry Phase Fischer-Tropsch Synthesis Test

During a confidential Pilot Plant slurry phase Fischer-Tropsch synthesis test run, using 5 kg of catalyst prepared on unmodified alumina, ie catalyst B, in a 11 m high bubble column reactor with an external recycle, the secondary filtered wax product turned grey after about 10 days on stream and the cobalt content increased to 350 ppm after 25 days on stream, as shown in FIG. 5. The test runs were completed under realistic Fischer-Tropsch synthesis conditions:

| | |
|---|---|
| Reactor temperature: | 230° C. |
| Reactor pressure: | 20 Bar |
| % ($H_2$ + CO) conversion: | 50–70% |
| Feed gas composition: | |
| $H_2$: | about ('ca') 50 vol % |
| CO: | ca 25 vol % |
| Balance: | Ar, $N_2$, $CH_4$ and or $CO_2$ |

The wax product produced in the Fischer-Tropsch synthesis test run was thus subjected to a primary solids separation step, and thereafter to secondary ex-situ filtration through Whatmans 42 (trademark) filter paper, to obtain the secondary filtered wax product.

The presence of a high cobalt content in the secondary filtered wax product is believed to be due to the dislodgment of cobalt crystallites that were deposited on top of the physically bonded re-precipitated aluminium structures (eg hydrotalcites, boehmite), present in the catalyst after aqueous slurry phase impregnation of cobalt, when the catalyst is prepared from an untreated catalyst support.

Pilot Plant slurry phase Fischer-Tropsch synthesis tests runs performed on catalyst A, prepared on the modified alumina support with a silicon loading of 2.5 Si atoms/$nm^2$ untreated support, showed a substantial improvement with respect to the submicron cobalt particulate contamination in the secondary filtered wax product, as is evident from FIG. 5. After 22 days on stream the catalyst with 2.5 Si atoms/$nm^2$ untreated support did not show any cobalt in these secondary filtered wax product.

From the Pilot Plant synthesis tests, it can be seen that the improvement of the inertness of the untreated alumina support by modifying it with silica, as shown by conductivity measurements, also prevented the dislodging of ultra fine cobalt rich particulates.

3. Laboratory Slurry Phase Fischer-Tropsch Synthesis

Cobalt catalyst precursors were reduced prior to Fischer-Tropsch synthesis in a tubular reactor at a hydrogen space velocity of 200 $ml_n$ hydrogen/g catalyst/h and atmospheric pressure. The temperature was increased to 425° C. at 1° C./min, after which isothermal conditions were maintained for 16 hours.

Between 10 g and 30 g of the resultant reduced catalyst, ranging between 38 µm to 150 µm, was suspended in 300 ml molten wax and loaded in a CSTR with an internal volume of 500 ml. The feed gas consisted of hydrogen and carbon monoxide in a $H_2/CO$ molar ratio from 1.5/1 to 2.3/1. This reactor was electrically heated and sufficiently high stirrer speeds were employed so as to eliminate any gas-liquid mass transfer limitations. The feed flow was controlled by means of Brooks mass flow controllers, and space velocities ranging from 2 and 4 $m^3{}_n/kg_{cat}hr$ were used. GC analyses of the permanent gases as well as the volatile overhead hydrocarbons were used in order to characterize the product spectra.

The laboratory test runs were completed under realistic Fischer-Tropsch synthesis conditions:

| | |
|---|---|
| Reactor temperature: | 220° C. |
| Reactor pressure: | 20 bar |
| % ($H_2$ + CO) conversion: | 50–70% |
| Feed gas composition: | |
| $H_2$: | ca 50 vol % |
| CO: | ca 25 vol % |
| Balance: | Ar, $N_2$, $CH_4$ and/or $CO_2$ |

Having applied a reported cobalt based Fischer-Tropsch kinetic equation, such as:

$$r_{FT}=(k_{FT}P_{H2}P_{co})/(1+K\,P_{co})^2$$

the Arrhenius derived pre-exponential factor of $k_{FT}$ was estimated for each of the reported runs. By defining the relative intrinsic Fischer-Tropsch activity as (pre-exponential factor of catalyst X after reduction test)/(pre-exponential factor of catalyst B), where X is catalyst A or B, the intrinsic Fischer-Tropsch activities of the cobalt catalysts could be compared. The initial relative intrinsic Fischer-Tropsch activity is determined after 15 hours on line, as given in Table 1. It is clear that support modification did not influence the intrinsic Fischer-Tropsch characteristics when compared to the untreated alumina supported cobalt catalyst, Catalyst B.

TABLE 1

Laboratory CSTR Fischer-Tropsch synthesis performance comparison between catalysts prepared on untreated (catalyst B) and silicon modified alumina supports (catalyst A).

| Run number | Catalyst A 363F | Catalyst B 233$ |
|---|---|---|
| Synthesis conditions: | | |
| Calcined catalyst mass (g) | 22.2 | 20.6 |
| Reactor temp (° C.) | 220.0 | 221.0 |
| Reactor pressure (bar) | 20.0 | 20.0 |
| Time on stream (h) | 16.0 | 15.0 |
| Feed gas composition: | | |
| $H_2$ (vol %) | 52.6 | 52.2 |
| CO (vol %) | 27.9 | 26.4 |
| (Balance = Ar, $CH_4$ + $CO_2$) | | |
| Syngas ($H_2$ + CO) space velocity ($m^3{}_n$/(kg cat.h) | 3.6 | 3.0 |
| Reactor partial pressures (bar) | | |
| $H_2$ | 5.5 | 4.5 |
| CO | 2.9 | 2.5 |
| $H_2O$ | 4.5 | 4.8 |
| $CO_2$ | 0.3 | 0.3 |
| Synthesis performance | | |
| Conversion: % syngas | 61.7 | 68.3 |
| Initial relative intrinsic FT activity | 1.0 | 1.0 |
| % CO of total amount of CO converted to $CO_2$ | 1.3 | 3.3 |
| % C-atom $CH_4$ selectivity | 5.3 | 4.3 |

The catalyst of the present invention, obtained by impregnating a protected modified catalyst support according to the invention, was found to have excellent Fischer-Tropsch synthesis behaviour, resulting in high activity and selectivity. It was surprisingly found that the modified support material does not have to be calcined, after impregnation with the modifying component precursor and subsequent drying, to have the required inertness in aqueous media. These protected modified supports thus have an increased inertness towards an aqueous attack during subsequent slurry phase impregnation. Using catalysts prepared on these protected modified supports has resulted in a dramatic decrease in the formation of active phase-containing ultra-fine particulates during slurry phase Fischer-Tropsch synthesis. A slurry phase Fischer-Tropsch process, using the modified supported catalyst, produced a secondary filtered wax product containing less than 50 ppm active phase ultra fines throughout extended slurry phase Fischer-Tropsch synthesis runs, thus reducing the cost for the catalyst used in the slurry phase Fischer-Tropsch process substantially. Due to the extreme difficulty with which separation of submicron particulates from wax product is achieved, the problem of removing solids from this wax product has thus been alleviated considerably.

What is claimed is:

1. A method of treating an untreated catalyst support to suppress its solubility in neutral and/or acid aqueous solutions, which method includes contacting an untreated catalyst support which is partially soluble in an aqueous acid solution and/or in a neutral aqueous solution with a modifying component precursor of the formula Me(OR)x where Me is a modifying component selected from Si, Zr, Ti, Cu, Zn, Mn, Ba, Co, Ni, Na, K, Ca, Sn, Cr, Fe, Li, Tl, Mg, Sr, Ga, Sb, V, Hf, Th, Ce, Ge, U, Nb, Ta, and W, R is an alkyl or acyl group, and x is an integer having a value of from 1 to 5, thereby to introduce the modifying component onto and/or into the catalyst support and to form a protected modified catalyst support which is thus less soluble or more inert in the aqueous acid solution and/or the neutral aqueous solution, than the untreated catalyst support, with no calcination of the catalyst support, after treatment thereof with the modifying component precursor, being effected.

2. A method according to claim 1, wherein the untreated catalyst support is in particulate form, with the modifying component being present, in the protected modified catalyst support particles, on the particle surfaces by being chemically bonded to the particle surfaces.

3. A method according to claim 2, wherein the modifying component is chemically bonded to hydroxyl groups on the support particle surfaces.

4. A method according to claim 1, wherein the contacting of the untreated catalyst support with the modifying component precursor is by means of impregnation.

5. A method according to claim 4, wherein the modifying component precursor is an organic silicon compound, so that the modifying component is silicon.

6. A method according to claim 5, wherein the organic silicon compound is tetra ethoxy silane or tetra methoxy silane.

7. A method according to claim 5, wherein the untreated catalyst support is an alumina catalyst support, with the silicon-based modifying component precursor being used in a quantity such that the silicon level in the resultant protected modified catalyst support is at least 0.06 Si atoms/nm2 of the untreated catalyst support.

8. A method according to claim 7, wherein the untreated alumina support is a spray-dried alumina catalyst support, with sufficient silicon-based modifying component precursor being used such that the upper limit of silicon in the resultant protected modified catalyst support is 2.8 Si atoms/nm2 of untreated catalyst support.

9. A method according to claim 5, wherein the organic silicon compound is dissolved in an impregnation solvent having a boiling point, at atmospheric pressure, of less than 100° C., with the catalyst support being admixed with the resultant solution to form a treatment mixture, and the treatment mixture maintained at an elevated temperature at or near the boiling point of the impregnation solvent for 1 minute to 20 hours to impregnate the modifying agent into and/or onto the catalyst support.

10. A method according to claim 9, wherein the impregnation is effected at atmospheric pressure, and the period of time for which the impregnation is effected is from 1 minute to 20 hours.

11. A method according to claim 9, wherein the impregnated support is dried to obtain the protected modified catalyst support, with the drying being effected under a drying pressure or vacuum of 0.01 to 1 bar(a), and at a temperature equal to the boiling point of the solvent at the drying pressure.

12. A method according to claim 4, wherein the modifying component precursor is a zirconium alkoxide so that the modifying component is zirconium.

13. A method according to claim 12, wherein the zirconium alkoxide is dissolved in an impregnation solvent having a boiling point, at atmospheric pressure, of less than 100° C., with the catalyst support being admixed with the resultant solution to form a treatment mixture, and the treatment mixture maintained at an elevated temperature at or near the boiling point of the impregnation solvent for a period of time to impregnate the modifying agent into and/or onto the catalyst support.

14. A method according to claim 13, wherein the impregnation is effected at atmospheric pressure, and the period of time for which the impregnation is effected is from 1 minute to 20hours.

15. A method according to claim 13, wherein the impregnated support is dried to obtain the protected modified catalyst support, with the drying being effected under a drying pressure or vacuum of 0.01 to 1 bar(a), and at a temperature equal to the boiling point of the solvent at the drying pressure.

16. A method of forming a catalyst precursor, which method comprises mixing a protected modified catalyst support obtained by the method of claim 1, with an aqueous solution of an active catalyst component or its precursor, to form a slurry, and impregnating the protected modified catalyst support with the active catalyst component or its precursor, to form the catalyst precursor.

17. A method according to claim 16, wherein the mixing of the protected modified catalyst support and the active catalyst component or its precursor aqueous solution, and the impregnating thereof, comprises subjecting a slurry of the protected modified catalyst support or carrier, water and the active catalyst component or its precursor to a sub-atmospheric pressure environment, drying the resultant impregnated carrier under a sub-atmospheric pressure environment, and calcining the dried impregnated carrier and, optionally, repeating the impregnation drying and calcination if a higher active catalyst component leading is required, thereby to obtain the catalyst precursor.

18. A method according to claim 16, wherein, during the impregnation, a water soluble precursor salt of platinum or palladium is added, as a dopant capable of enhancing the reducibility of the active component, with the mass proportion of dopant to active catalyst component being between 0.01:100 and 0.3:100.

* * * * *